United States Patent [19]
Goertz et al.

[11] Patent Number: 6,039,781
[45] Date of Patent: Mar. 21, 2000

[54] PRECOATED CONTROLLED RELEASE FERTILIZERS AND PROCESSES FOR THEIR PREPARATION

[75] Inventors: Harvey M. Goertz; Richard J. Timmons, both of Marysville, Ohio; William R. Johnson, San Jose, Calif.

[73] Assignee: OMS Investments, Inc., Wilmington, Del.

[21] Appl. No.: 09/094,329

[22] Filed: Jun. 9, 1998

[51] Int. Cl.[7] .......................... A01N 25/00; A01N 25/08; A01N 25/10; C05C 9/00

[52] U.S. Cl. .............. 71/1; 71/64.01; 71/64.07; 71/64.11; 71/28

[58] Field of Search .................... 71/28, 29, 30, 71/64.06, 64.07, 64.08, 64.13, 903, 904, 1, 64.01

[56] References Cited

U.S. PATENT DOCUMENTS

| | | | |
|---|---|---|---|
| 3,223,518 | 12/1965 | Hansen | 71/64 |
| 3,259,482 | 7/1966 | Hansen | 71/64.11 |
| 4,549,897 | 10/1985 | Seng et al. | 71/64.11 |
| 4,657,576 | 4/1987 | Lambie | 71/64.11 |
| 5,089,041 | 2/1992 | Thompson et al. | 71/64.11 |
| 5,186,732 | 2/1993 | Thompson et al. | 71/64.11 |
| 5,219,465 | 6/1993 | Goertz et al. | 71/28 |
| 5,300,135 | 4/1994 | Hudson et al. | 71/28 |
| 5,399,186 | 3/1995 | Derrah et al. | 71/64.11 |
| 5,405,426 | 4/1995 | Timmons et al. | 71/28 |
| 5,429,654 | 7/1995 | Swarup | 71/64.11 |
| 5,466,274 | 11/1995 | Hudson et al. | 71/28 |
| 5,652,196 | 7/1997 | Luthra et al. | 71/64.11 |

FOREIGN PATENT DOCUMENTS

| | | | |
|---|---|---|---|
| 2111686 | 10/1988 | Japan | 71/64.11 |

*Primary Examiner*—Gary P. Straub
*Assistant Examiner*—Eileen F. Nave
*Attorney, Agent, or Firm*—Jones, Day, Reavis & Pogue

[57] ABSTRACT

A controlled release fertilizer formed from nutrient granules having intermediate or precoat layers of organic oil, such as raw linseed oil, prior to application of a polymeric, encapsulating coat. The precoat may also contain a binding agent, such as a fine clay, and a drier. The new fertilizer composition is made by a process of applying the oil precoat, but not curing it until after the encapsulating coat is applied. The use of the precoat provides more desirable controlled (delayed) release characteristics at a lower weight of the encapsulating coat, particularly for nutrient cores having a relatively large number of surface imperfections or discontinuities.

35 Claims, 6 Drawing Sheets

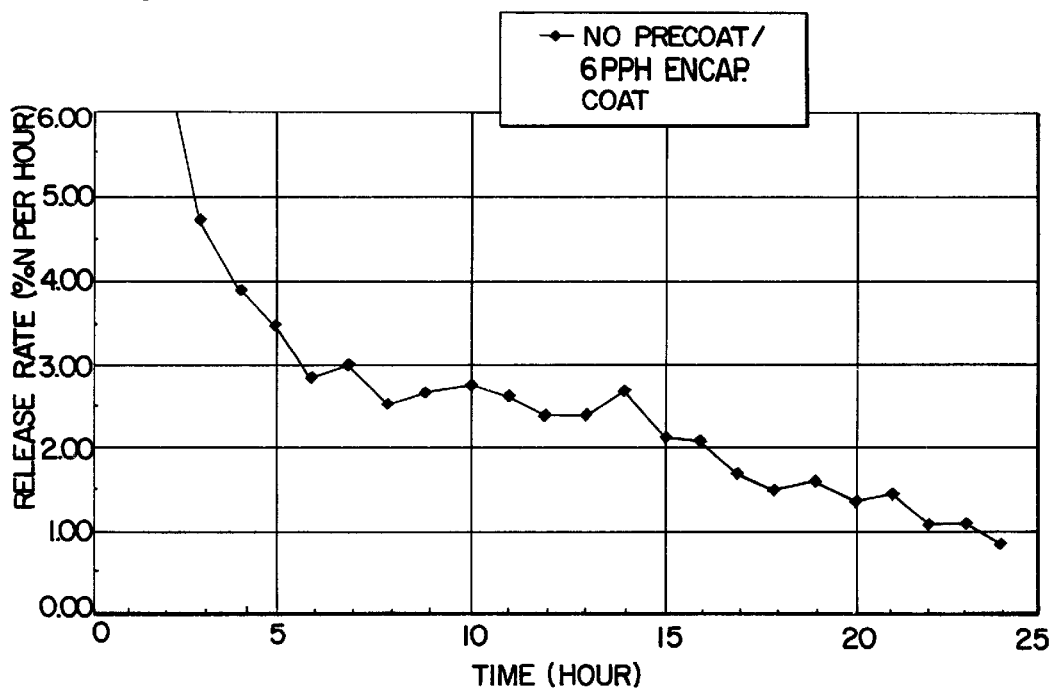
FIG.1 ART-80 LAB TEST
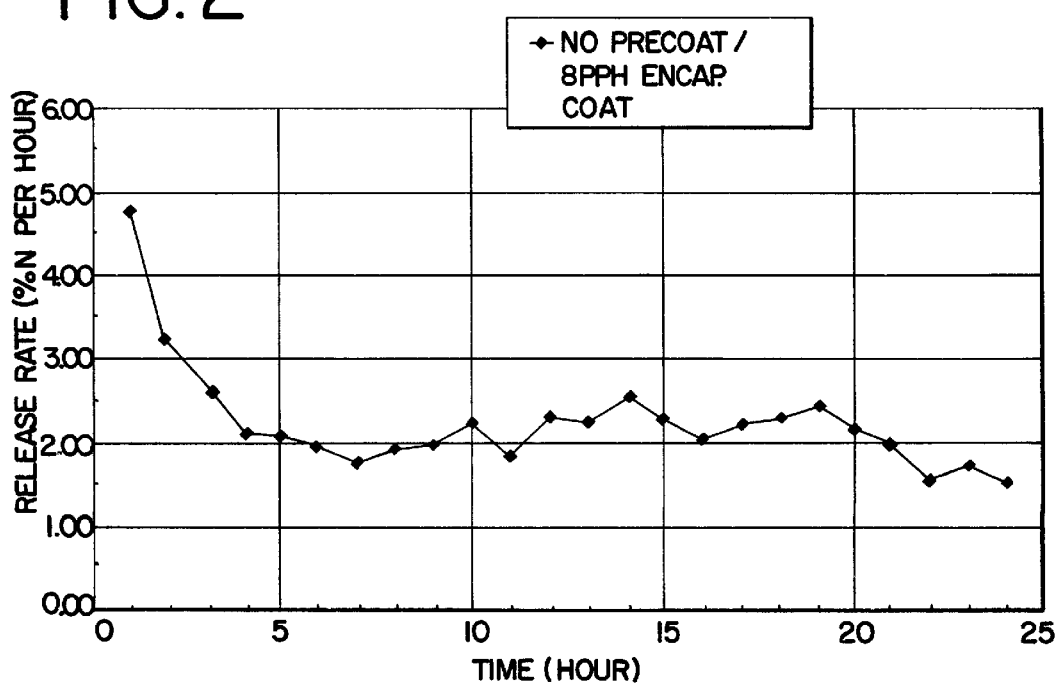
FIG.2 ART-80 LAB TEST

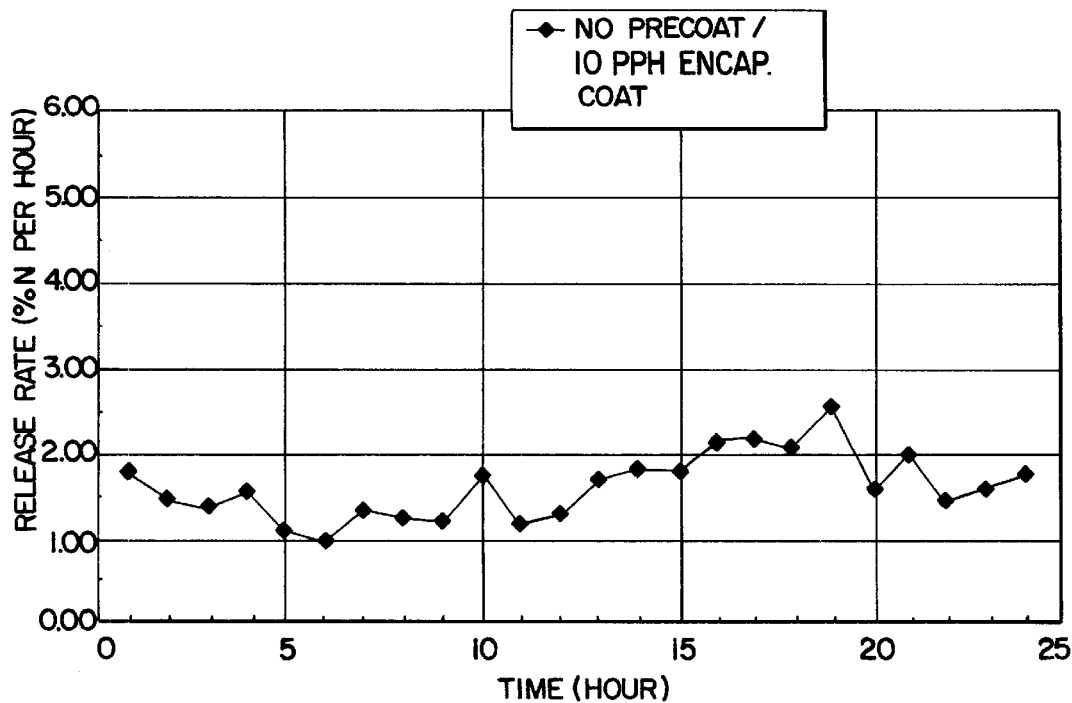
FIG. 3  ART-80 LAB TEST
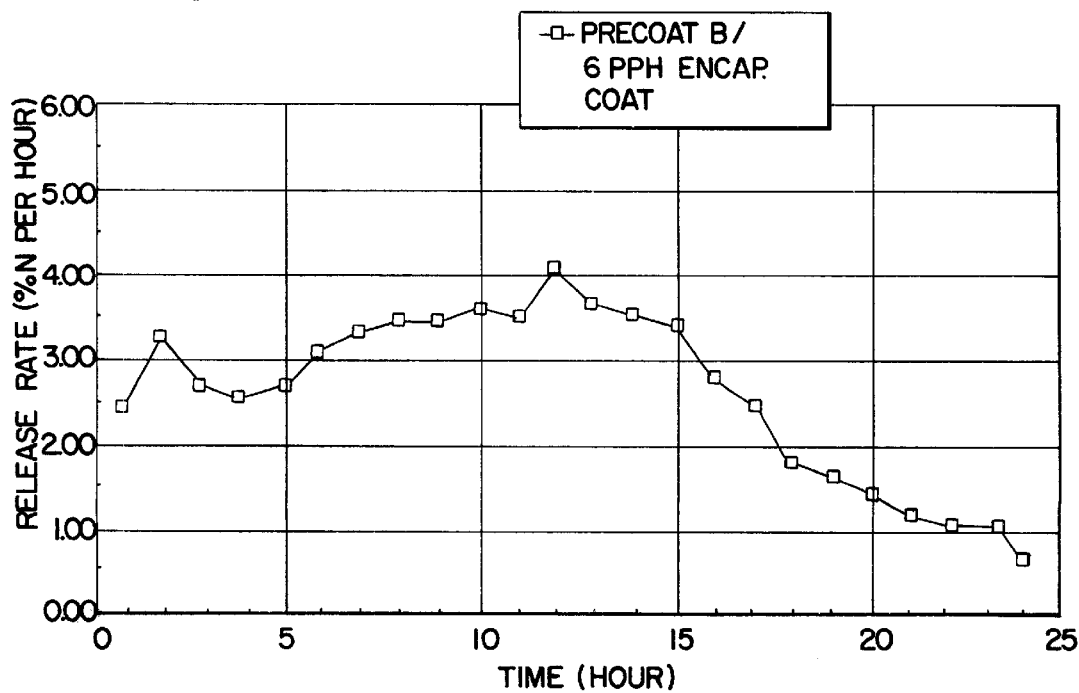
FIG. 4  ART-80 LAB TEST

FIG.5 ART-80 LAB TEST
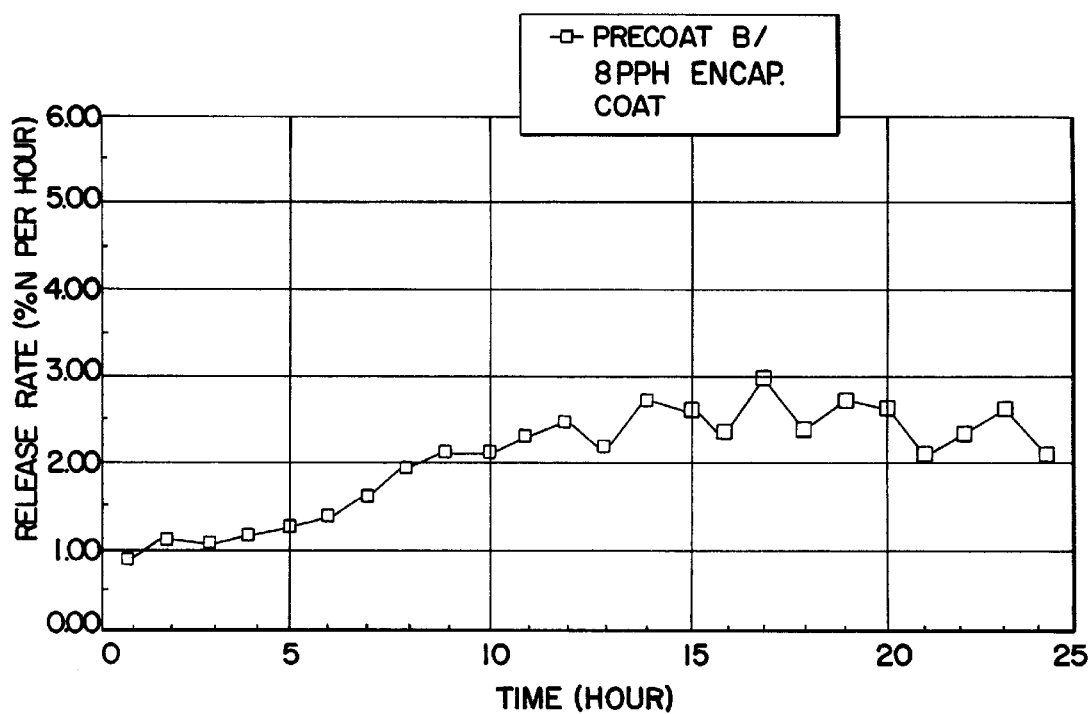
FIG.6 ART-80 LAB TEST
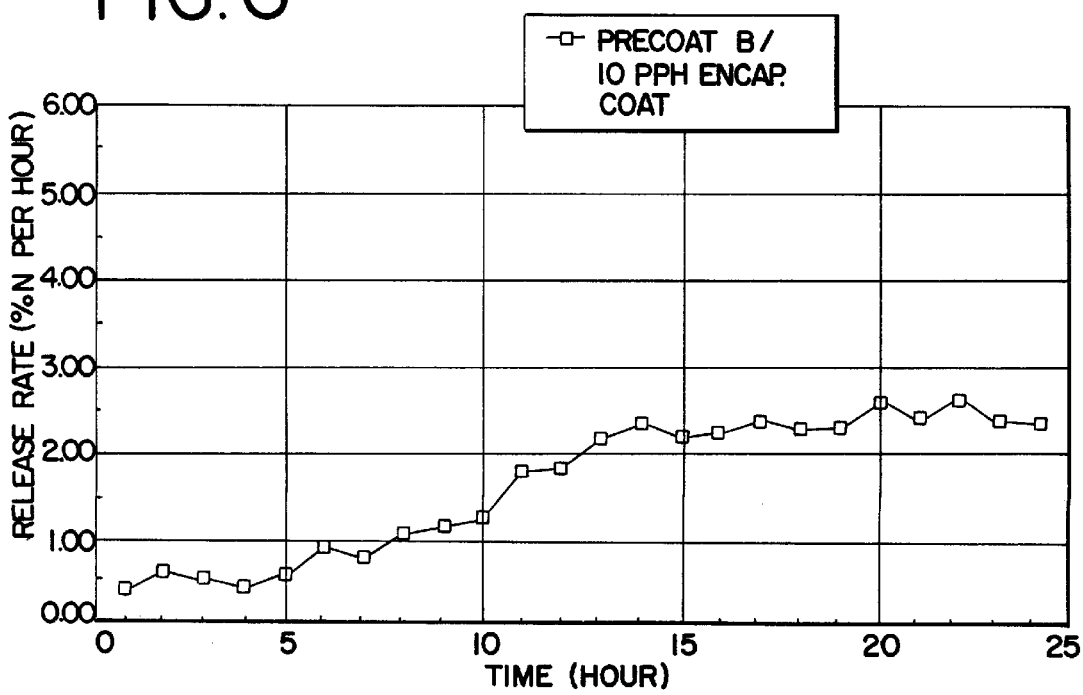

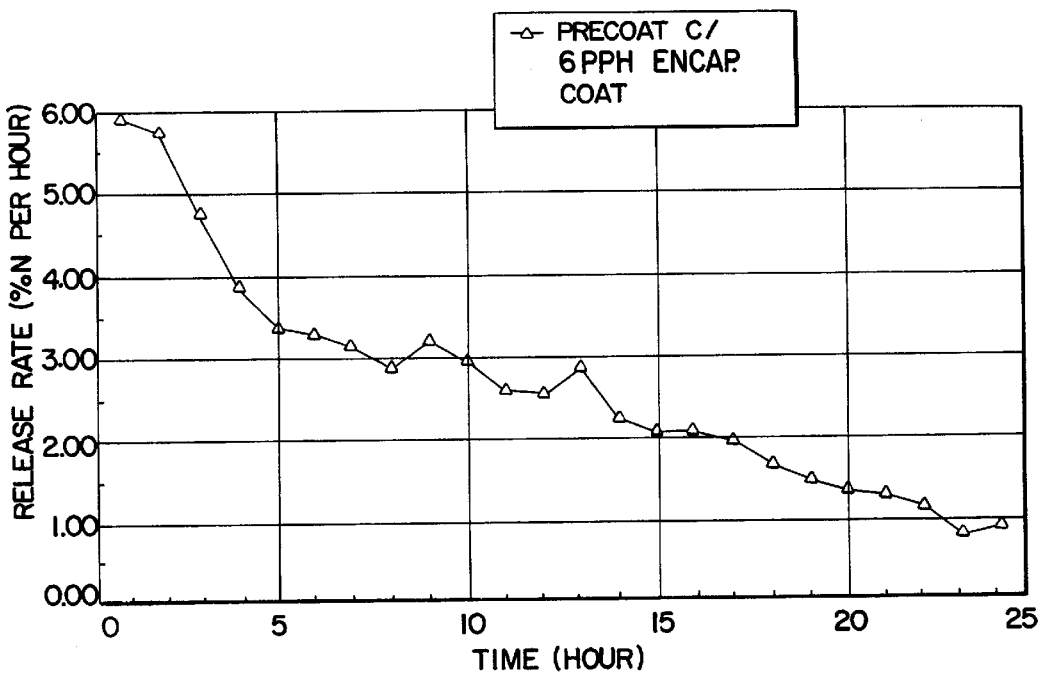
FIG. 7 ART-80 LAB TEST
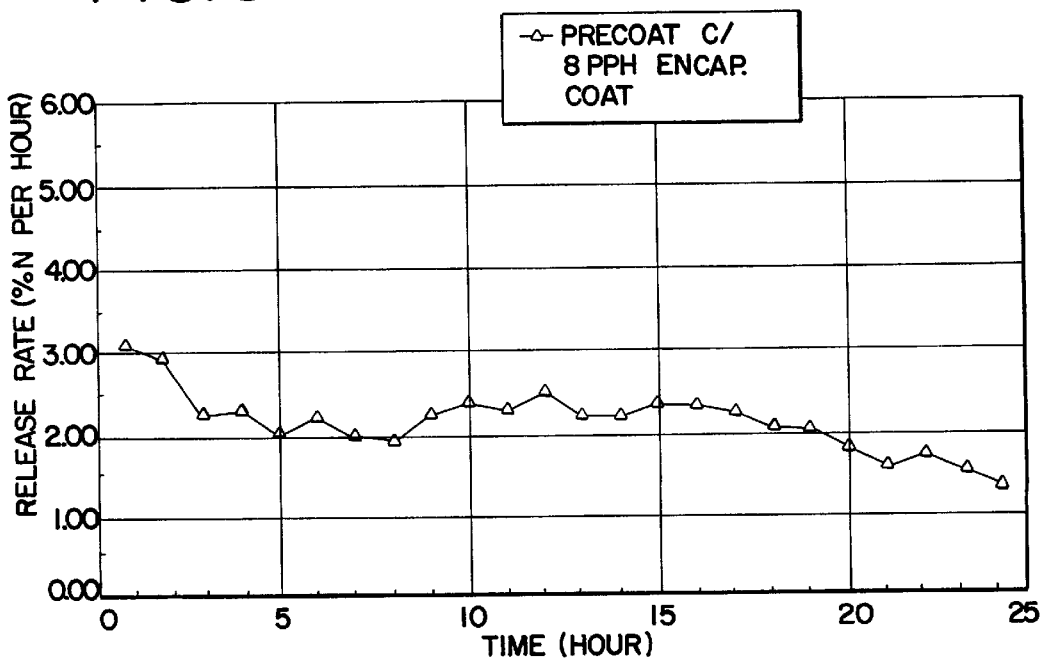
FIG. 8 ART-80 LAB TEST

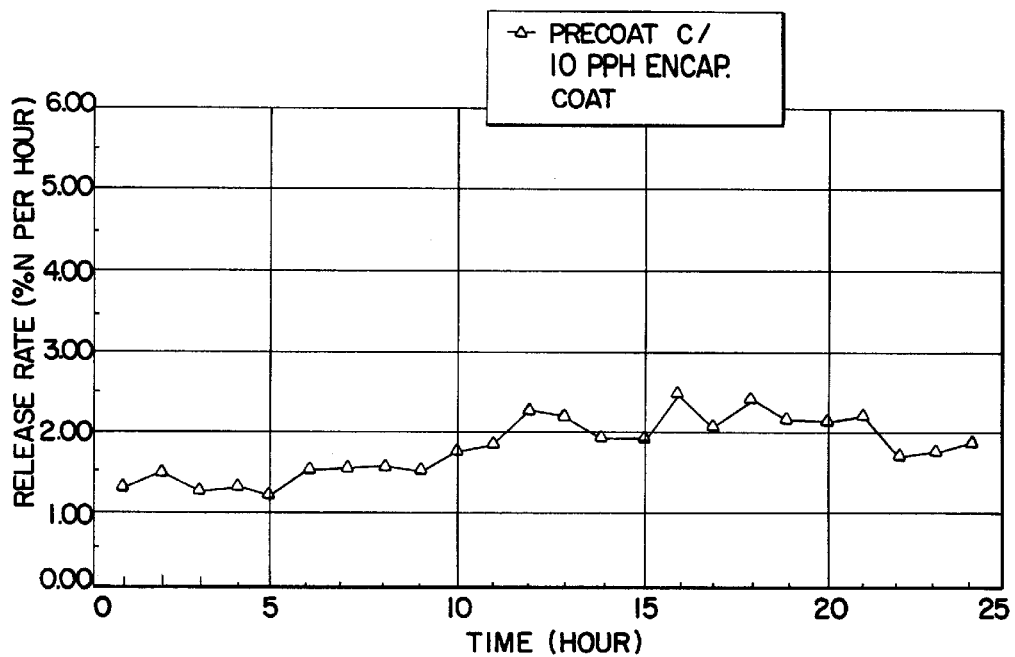
FIG.9  ART-80 LAB TEST
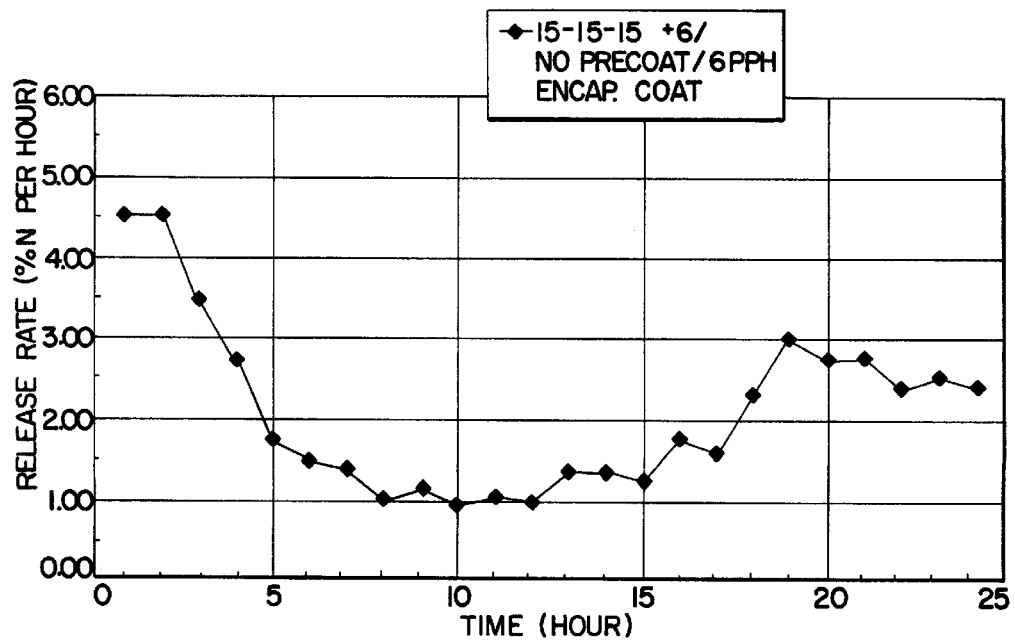
FIG.10  ART-80 LAB TEST

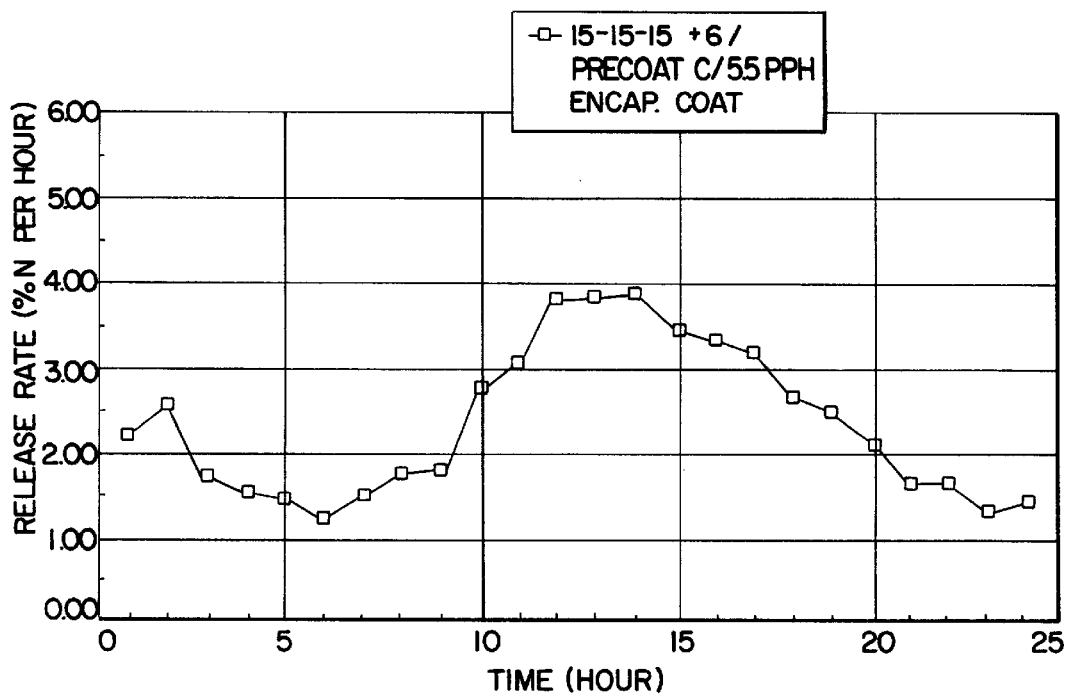

PRECOATED CONTROLLED RELEASE FERTILIZERS AND PROCESSES FOR THEIR PREPARATION

BACKGROUND OF THE INVENTION

1. Field of the Invention

This invention relates to controlled release fertilizers and processes for their preparation. More particularly, it relates to particulate fertilizer compositions formed from nutrient granules (such as NPK granules) having intermediate layers or precoats and encapsulating or outer coats applied thereon. It also relates to processes for producing particulate fertilizer compositions that have desirable controlled release characteristics.

2. Description of Related Art

Fertilizers have been used for thousands of years to supplement nutrients in growing media. It has been known for some time that the benefit provided by the additional nutrient may depend on when it is delivered to the growing media and, in turn, made available to plants growing in the growing media. Sudden delivery of too much fertilizer can be wasteful or even detrimental to the plants. Delivery of too little fertilizer or delayed delivery of an adequate amount, on the other hand, may starve plants. It is desirable to provide particulate fertilizer compositions that deliver a relatively uniform rate of nutrient to the growing media over time or another specific release pattern.

Delivery of the correct amount of nutrient during an extended growing period previously required multiple applications of a relatively small amount of fertilizer compositions, a very labor intensive method. Accordingly, controlled release fertilizers were developed. Currently, it is desirable to apply the fertilizer once every few weeks to several months.

Generally, controlled release fertilizers used coatings around the nutrient granule to act as a physical or chemical barrier between the nutrient core and the ambient growing media The barrier delayed contact of the nutrient core with moisture and thereby delayed the moisture dissolving the core, and release of the nutrient into the growing media The rate of release of nutrient depended on the material used as the barrier, and its thickness and integrity, among other factors.

One approach to utilizing the barrier or encapsulating technique is shown in U.S. Pat. No. 3,223,518, issued Dec. 14, 1965 to Louis I. Hansen and assigned on its face to Archer-Daniels-Midland. The Hansen patent contemplates fertilizer products having single or multiple layers of a primer coating applied onto a nutrient core with single or multiple encapsulating layers. As described in the Hansen patent, the primer coating was fully cured before application of the encapsulating coating. The resulting fertilizer showed delayed release of the core nutrient as compared to a completely uncoated nutrient granule. However, repeated application of coatings and curing thereof has been found to be time consuming and commercially unfeasible. Furthermore, fertilizers made according to the teachings of Hansen, having only one primer and only one encapsulating coating, are disclosed by Hansen as releasing from 30–40% of the nutrient within 6 hours of contact with moisture and 50–60% within 24 hours. Such a product delivers too much nutrient too quickly to be acceptable for some controlled release fertilizer applications.

Another, later approach to attempting to provide an encapsulating layer with desirable release characteristics is described in U.S. Pat. No. 4,657,576, issued on Apr. 14, 1987, to Johannes M. H. Lambie and assigned on its face to Sierra Chemical Company. The core is encapsulated with a water-insoluble dicyclopentadiene based resin, such as that sold in the market by The Scotts Company in association with the trademark OSMOCOTE®. Although the use of a polymeric barrier is similar to the encapsulating coating described in the Hansen '518 reference, ingredients that regulate the pH of the coating were added. According to this reference, this improved some aspects of the release pattern.

A recognized shortcoming of the application of a polymeric barrier, such as the OSMOCOTE® encapsulating layer, to a nutrient core was that the release properties of the fertilizer was dependent on the quality of the core or substrate over which the polymer was applied. Discontinuities in the surface of the substrates, such as holes in prilled substrates, deformed granules, or particles having cracks, crevices or irregularities, created incomplete or non-uniform coverage by the coating. Typically for lower coating weights, such as 5 parts per hundred of the core weight ("PPH"), not enough encapsulating material is provided to adequately cover the defects in the core surface of low quality core granules and an unacceptable amount of imperfectly coated particles are created. Predictably, too many of the resulting particles in a fertilizer composition release too much nutrient in the first few days, making them inappropriate for some controlled release (delayed release) products.

Attempts to compensate for incomplete or non-uniform coverage of inexpensive low quality, irregular core granules by applying a thicker layer of the encapsulating coating was found to produce less than desirable results. Doubling the coating weight to 10 parts per hundred, for example, will more efficiently cover the surface defects on more of the granules. However, this thicker outer coating so efficiently seals the nutrient in such a large number of the granules as to either cause "lock off" or to prevent release of nutrient from the core into the growing media during an overly long period of time to be commercially acceptable.

SUMMARY OF THE INVENTION

It is, therefore, a primary object of the invention to provide a fertilizer in which the nutrient core bears a preliminary or intermediate coating to enhance encapsulation by subsequent outer coats.

It is another object of the invention to provide a fertilizer in which desirable release characteristics are obtained, particularly for nutrient cores with a high degree of surface imperfections.

A further and related significant object is to provide a fertilizer in which the nutrient core granules bear multilayer coatings which are cured after application to the core to allow for desirable controlled release patterns that otherwise might not be obtainable, with or without use of higher coating weights.

Another important object is to provide a fertilizer in which imperfections on the surface of the nutrient granules are covered and/or filled with the use of relatively lower coating weights of the encapsulating layer to avoid thick layers that are expensive and cause lock off of nutrient release or excessive induction time to achieve release.

Yet another significant object is to provide a process for making a fertilizer having one or more of the objects described above, or other objects that will be apparent, in a safe and cost efficient manner.

In a preferred embodiment of this invention, it has been found that one or more of the above-identified objects, and others, can be accomplished by utilizing an uncured raw linseed oil or other uncured suitable oil coating between the nutrient core and an encapsulating coating of fertilizer nutrient granules such as dicyclopentadiene-linseed oil. The raw linseed oil may be mixed with a binding agent such as a fine clay, diatomaceous earth or similar material before application to the nutrient core. If desired, the processing time of the manufacture of the fertilizer composition may be decreased by also including a drying agent such as a manganese/cobalt drier with the oil and clay mixture.

Use of clay with the linseed oil has been found to improve the process for producing coated granular fertilizer products. For example, without the clay, a large amount of fines, i.e., small, broken off bits of the coating, are produced by the tumbling action encountered by the particles during processing. Also, raw linseed oil alone tends to penetrate the dicyclopentadiene-linseed oil encapsulating coating, bleeding or migrating through the outer, encapsulating polymeric layer. The presence of the oil on the outside of this layer creates processing problems.

Attempting to solidify the linseed oil precoat by curing of the precoat to create a separate cured layer, as suggested by the Hansen '518 patent, prevents undue diffusion or migration of the linseed oil into the outer encapsulating layer. Indeed, curing the precoat appears to interfere with the physical interaction of the raw linseed oil precoat and the encapsulating coat. It has now been discovered that the presence of a raw linseed oil precoat, without being cured, contributes a significant improvement to coverage of granular nutrient surface defects by the subsequent, encapsulating layer and to the release characteristics of the fertilizer composition.

The current invention takes advantage of the previously unknown interaction between the unsolidified, free moving linseed oil, which may be mixed with a binding agent such as clay, diatomaceous earth and the like, and the encapsulating coat. The interaction provides release characteristics for the finished fertilizer product that otherwise would only be obtainable at even greater coating weights, particularly for substrates containing holes or other surface discontinuity or imperfections. Though not completely understood, it is currently believed that the interaction of the linseed oil and the polymeric layer more efficiently fills and plugs the surface holes, cracks and crevices of the core granule. This same interaction decreases the induction time.

As compared to prior processing methods in which the precoat was applied and then cured before the outer polymeric coat is applied, the newly discovered interaction of oil precoat and encapsulating polymer can be exploited by a new manufacturing process. The precoat is not exposed to curing temperatures until after the encapsulating coat is applied, providing an opportunity for the filling and plugging interaction to occur. If the precoat materials are curable by the temperatures normally used to cure the encapsulating coating, it is expected that the precoat will be cured simultaneous to being exposed to temperatures that cure the encapsulating layer.

Use of the invention allows for the use of lower quality nutrient granules, with less weight of encapsulating coating, to achieve overall more desirable controlled release characteristics. The current invention is a step forward in the effort to obtain improved coverage of a core having imperfect surface characteristics without the deleterious effects and greater expense of using thicker coating weights.

BRIEF DESCRIPTION OF THE DRAWINGS

FIG. 1 is a plot of integral nutrient (nitrogen) release (as a percent of total nitrogen) versus time (in hours) for nutrient granules having relatively low sphericity that were covered with 6 PPH of a polymeric encapsulating layer;

FIG. 2 is a plot of integral nutrient (nitrogen) release (as a percent of total nitrogen) versus time (in hours) for nutrient granules having relatively low sphericity that were covered with 8 PPH of a polymeric encapsulating layer;

FIG. 3 is a plot of integral nutrient (nitrogen) release (as a percent of total nitrogen) versus time (in hours) for nutrient granules having relatively low sphericity that were covered with 10 PPH of a polymeric encapsulating layer;

FIG. 4 is a plot of integral nutrient (nitrogen) release (as a percent of total nitrogen) versus time (in hours) for nutrient granules having relatively low sphericity that were covered with Precoat B (1.0 PPH linseed oil based precoat) and 6 PPH of a polymeric encapsulating layer;

FIG. 5 is a plot of integral nutrient (nitrogen) release (as a percent of total nitrogen) versus time (in hours) for nutrient granules having relatively low sphericity that were covered with Precoat B (1.0 PPH linseed oil based precoat) and 8 PPH of a polymeric encapsulating layer;

FIG. 6 is a plot of integral nutrient (nitrogen) release (as a percent of total nitrogen) versus time (in hours) for nutrient granules having relatively low sphericity that were covered with Precoat B (1.0 PPH linseed oil based precoat) and 10 PPH of a polymeric encapsulating layer;

FIG. 7 is a plot of integral nutrient (nitrogen) release (as a percent of total nitrogen) versus time (in hours) for nutrient granules having relatively low sphericity that were covered with Precoat C (0.5 PPH linseed oil based precoat) and 6 PPH of a polymeric encapsulating layer;

FIG. 8 is a plot of integral nutrient (nitrogen) release (as a percent of total nitrogen) versus time (in hours) for nutrient granules having relatively low sphericity that were covered with Precoat C (0.5 PPH linseed oil based precoat) and 8 PPH of a polymeric encapsulating layer;

FIG. 9 is a plot of integral nutrient (nitrogen) release (as a percent of total nitrogen) versus time (in hours) for nutrient granules having relatively low sphericity that were covered with Precoat C (0.5 PPH linseed oil based precoat) and 10 PPH of a polymeric encapsulating layer;

FIG. 10 is a plot of integral nutrient (nitrogen) release (as a percent of total nitrogen) versus time (in hours) for Norsk substrate (screened +6, having sphericity of about 80%) covered with 6 PPH of a polymeric encapsulating layer; and, FIG. 11 is a plot of integral nutrient (nitrogen) release (as a percent of total nitrogen) versus time (in hours) for Norsk substrate (screened +6, having sphericity of about 80%) with Precoat C (0.5 PPH linseed oil based precoat) and 5.5 PPH of a polymeric encapsulating layer.

DETAILED DESCRIPTION

The invention contemplates both a new fertilizer product and a new process for making such a product. Generally, the fertilizer particles are made of a nutrient core, a precoat and an outer or encapsulating coat. The core may be standard NPK or fertilizer granules as is well known in the art and which are commercially available from Norsk Hydro, Kemira and other companies. Alternatively, cores of other common nutrients (for example, urea) also can be used. In addition, the core may include one or more secondary nutrients such as calcium, magnesium and sulfur or micronutrients such as iron, copper, zinc, manganese, boron and molybdenum.

While the invention will work with relatively spherical granules having relatively smooth surfaces, use of the invention makes its greatest impact when controlled release fertilizers are made from irregularly shaped granules or those with surfaces containing holes, imperfections, cracks and crevices. An example of the relatively smooth nutrient core would be the Norsk NPK complex fertilizers. Nutrient granules with relatively greater number of discontinuities surface imperfections tend to be less expensive, are commercially available, and generally have sphericity of 50% or less. Hence, in a preferred embodiment of this invention, relatively inexpensive, low sphericity material may be used for the core nutrient.

The sphericity test employed herein for purposes of determining the sphericity of the product and raw feed particles is similar to that described by Carpenter and Deitz (Research Paper 2238, 3. of Res. Of the NBS 41(37), September 1951). In particular, the sphericity test employed herein for purposes of determining the sphericity of the product and raw feed particles used a device consisting of a turntable 18" in diameter, mounted at an angle of 10 degrees with the horizontal. The turntable is rotated at 2 RPM. Particles are fed from a vibrating feeder. Particles are fed onto the lower left hand side of the turntable, approximately 5 inches from the center, 45 degrees from perpendicular. Particle drop is preferably ¼ inch or less.

Approximately 100 g. of nutrient particles is slowly fed onto the rotating turntable. The spherical particles roll off the turntable into a collection pan. The non-spherical particles remain on the turntable to a point where they are physically removed. The two fractions are then weighed to determine the percent spherical.

The precoat layer is preferably a mixture of raw linseed oil and fine clay. Precoats must be able to flow over the substrate surface, and penetrate into the outer coating. They must have low surface energy and low viscosity. Acceptable alternatives to linseed oil are other organic oils such as soybean oil, tung oil, dicyclopentadiene modified drying oils and lubricating oils. Other oils of viscosity less than 500 CPS that are compatible with the outer coating may be used if they have sufficiently low surface energy, are compatible with the material used as the encapsulating layer, and are capable of adequately penetrating the encapsulating layer, thereby having an impact on release characteristics. Also, the precoat could be a resin of raw linseed oil and dicyclopentadiene. This resin, normally used as an encapsulating coat with mineral spirits to a concentration of greater than 50% solids, can be applied as a precoat at a further dilution with mineral spirits to about 40% resin solids. Preferably the binding agent mixed with the organic oil is a fine clay. Fine clays are commercially available as RM-4 from Industrials Minerals Company, and Huber 90 and Polygloss 90, both from JM Huber Corporation. Alternatively, instead of fine clay, or in addition thereto, talcs, diatomaceous earths, and absorbent silicas may be used.

Precoats such as raw linseed oil tend to flow through the outer coating, render it soft and susceptible to abrasion. The use of clay in a mixture of linseed oil and clay restricts the movement of the linseed oil to only the portion of the outer coating adjacent the precoat. Such clays typically have an oil absorption of about 40% or higher, with a particle size having a minimum of 60%, passing through a number 200 screen. It has been found that good coatings have been obtained with precoats such as raw linseed oil, however when linseed oil is used, additional processing time was required to dry the outer coating. This problem was solved by mixing a drier with the oil-clay precoat. Examples of suitable driers are cobalt manganese, manganese, cobalt calcium, zirconium cobalt and mixtures thereof.

Preferably the precoat is applied in a proportion of 0.5–1.0 PPH oil to weight of the core. Alternatively, the precoat may contain up to 3.0 PPH of oil. The higher proportion of oil in the precoat is particularly useful to obtain desirable release characteristics for nutrient cores having sphericity as low as 20%.

The outer coating must be compatible with the precoat and provide the necessary coverage and barrier characteristics. The outer coating is preferably a dicyclopentadiene ("DCPD") polymeric product (containing either linseed oil or an alkyd resin based on a soybean oil) such as OSMO-COTE® resin commercially available from The Scotts Company. Alternatively, other sealing materials can be used as an encapsulating coat such as oleoresinous drying oils, other thermosetting polymers and resins such as polyesters, polyamides or polyurethanes, and thermoplastic resins. More specific examples are DCPD modified linseed oil or alkyd resins, and hydrocarbon thermoplastic resins.

The desired beneficial release characteristics of the fertilizer compositions of the present invention may be achieved by not exposing the precoat materials to temperatures too high to cure the oil after it is applied on the nutrient, but before the encapsulating layer is applied. In the preferred embodiment, in which the curing temperature for the linseed oil is similar to that for the polymeric encapsulating layer, the precoat layer may be simultaneously cured with the encapsulating material, in situ, after application of the encapsulating layer to the nutrient granule. Alternatively, it may be possible to cure the precoat after the encapsulating layer is applied, but before the encapsulating layer is cured.

The linseed oil precoat of the preferred embodiment can be applied at a temperature as high as 140° F. without effecting significant curing. It is expected that the encapsulating coat will be applied at about 140° F. or higher. Because the linseed oil takes longer to cure than the encapsulating polymer in the preferred embodiment, curing of the oil and the encapsulating layer will occur at the same time.

EXAMPLE 1

A 50-lb. batch of nutrient granular substrate (core) is placed in the pilot coater and preheated to 130–140° F. for 15 minutes before coating. Precoats are added at a rate of approximately 0.1 lb./min. at 130–140° F. Immediately following precoat addition, application of the encapsulating coating was begun at approximately 0.1 lb. per min. and bed temperature was gradually increased. On occasion, two three-minute stops are included during the encapsulating polymeric coating to assure cure of the initial layers of encapsulant. Final bed temperature was 185–190° F. At completion of liquid addition, inlet air is shut off, 50 ml of clay is added, inlet air is restarted and the temperature is allowed to cool to 160° F. The product is cooled further to 130° F. in a cement mixer.

Products produced by the above process were analyzed according to the DDR-40 test. For the DDR-40 test, samples were placed in water at 40° C. A 15 g. quantity of the product in a nylon bag is suspended in 150 g. of $H_2O$. Test aliquots were removed and a complete change of water is made at 1, 3, 7 and 10 days and then 3 or 4 day intervals until the bulk of the nutrients have been released. At each testing interval an aliquot of the water is tested for nitrogen (sometimes also for potassium and phosphorous and other nutrients) and reported as percent nitrogen release of the total nitrogen in the product.

TABLE 1

5 PPH OSMOCOTE ® Encapsulating Resin On Norsk 21-7-14 Substrate

| Expt. No. | Precoat | DDR-40-3 Days (% Released) | DDR-40-Max Release (Day) |
|---|---|---|---|
| Pilot Plant-1 | None | 16 | 32 |
| Pilot Plant-2 | 1 PPH Raw Linseed Oil | 10 | 14 |
| Production Plant-1 | None | 21 | 27 |
| Production Plant-2 | 0.5 PPH Raw Linseed Oil + Clay | 11 | 20 |

For certain controlled release products, a maximum incremental release in the DDR-40 of 32 days, as shown for the fertilizer composition without a precoat, is undesirably long. For such products, 13% or less of imperfectly coated particles which release in the first 3 days, as reflected in the DDR-40 3 day percent release results, is acceptable.

In Table 1, the DDR-40 results of the pilot plant fertilizer composition No. 1, without a precoat, can be compared to pilot plant composition No. 2 which contains the precoat. Note the improvement in the DDR-40—3 days reported release from 16% to 10% with the linseed oil precoat. Also, the composition with the precoat showed a peak release at 14 days as compared to 32 days without the precoat. A similar improvement is shown for the production plant DDR-40 comparisons for compositions without a precoat, as compared to compositions having a linseed oil-clay precoat.

EXAMPLE 2

The compositions of three precoats illustrating ways of utilizing this invention are shown in Table 2 below.

TABLE 2

| Precoat A | | Precoat B | | Precoat C | |
|---|---|---|---|---|---|
| 1.0 PPH Resin | | 1.0 PPH Oil | | 0.5 PPH Oil | |
| 40% Resin (75%) | | Raw Linseed Oil (75%) | | Raw Linseed Oil (75%) | |
| RM-4 Clay (25%) | | RM-4 Clay (25%) | | RM-4 Clay (25%) | |
| Drier: 914-4 Mooney Chemicals (% wet drier to resin solids 7.5%) | | Drier: 914-4 Mooney Chemicals (% wet drier to resin solids 7.5%) | | Drier: 914-4 Mooney Chemicals (% wet drier to resin solids 7.5%) | |
| % Cobalt | 3.3% | % Cobalt | 3.3% | % Cobalt | 3.3% |
| % Manganese | 6.5% | % Manganese | 6.5% | % Manganese | 6.5% |
| Color | Blue Black | Color | Blue Black | Color | Blue Black |
| % NVM (Solids) | 60 | % NVM (Solids) | 60 | % NVM (Solids) | 60 |
| WT/Gal., Lbs. | 8.2 | WT/Gal., Lbs. | 8.2 | WT/Gal., Lbs. | 8.2 |
| Flash Point | 104 F | Flash Point | 104 F | Flash Point | 104 F |

The resin of Precoat A is a low viscosity solution of DCPD modified linseed oil after dilution with mineral spirits, and mixed with a suitable absorbent and drier. The precoat has been diluted with mineral spirits so that it contains about 40% resin solids. Precoats B and C represent 1.0 PPH and 0.5 PPH, respectively, of raw linseed oil with suitable absorbent and drier. Analysis of the dissolution rate of the precoated products was by ART-80 (80° C. water leach), conducted similarly as the DDR-40 method of Example 1, except there is no change of water as described above for the DDR-40 test. For some controlled release products, an ART-80 maximum release of 15 hours or less generally is acceptable, and a maximum ART-80 release at about 10 hours is desirable. A rough granular substrate (17-10-13) having relatively large number of surface imperfections (sphericity of 50% or less) was used. Three encapsulating coating weights were used, 6, 8 and 10 PPH for each precoat. The desired ART-80 release rate yields a pattern in which only 4% or less of the nutrient has released after two hours (when using imperfectly coated particles).

The incremental ART-80 release rates for a standard fertilizer in which no precoat was used is shown in FIGS. 1–3. Cumulative two hour release rates are the sum of the incremental rate at hour one plus the incremental rate at hour two. A high cumulative two hour release rate normally indicates too many imperfectly coated particles. The incremental release rate for the 6 PPH case bearing a relatively thin layer of OSMOCOTE® material is shown in FIG. 1. This fertilizer composition has been found to have a 17% cumulative release at two hours, an unacceptably high result. This suggests that the encapsulating coat did not sufficiently cover the surface imperfections on many of the granules. The 8 PPH case, shown in FIG. 2, also has cumulative release above the 4% specification at two hours. Finally, at 10 PPH, shown in FIG. 3, the product is below 4% at two hours for imperfectly coated particles.

FIGS. 4–6 show the ART-80 release results for using Precoat B, 1 PPH of 3:1 ratio linseed oil to clay and the drier. By using Precoat B and 6 PPH of the encapsulating coat, the two hour ART-80 release is reduced to about 5% (FIG. 4). The release for the 8 PPH coating, Precoat B case (FIG. 5), is similar to that of the heavier coating, 10 PPH, no precoat case (FIG. 3) and shows improvement in two hour ART-80 release over the granules in which 8 PPH of OSMOCOTE® material was used without a precoat (FIG. 2). As the amount of encapsulating coating is increased, the maximum peak moves to longer times to provide a product longevity series (FIGS. 4–6). Precoat B at 6 PPH resin reaches maximum release at about ten hours as is normally the case for some controlled release products.

FIGS. 7–9 show the results for compositions in which the 6, 8 and 10 PPH encapsulating layers were covering Precoat C (0.5 PPH linseed oil w/clay (3:1 ratio) and drier). Precoat C gives an intermediate result between no precoat and the 1 PPH precoat. At 8 PPH, shown in FIG. 8, Precoat C appears to reduce the amount of imperfectly coated particles when compared to 8 PPH with no precoat (FIG. 2).

Similar benefits were obtained with Norsk substrates having relatively smoother surfaces. Because of the smooth surface of the Norsk prill, the amount of linseed oil used in the coating was reduced to 0.5 PPH (Precoat C). ART-80 data is used (release in hours at 80 C.) for comparison purposes. FIGS. 10 and 11 show incremental release rates for the Norsk substrate.

Use of the +6 mesh (large particle) fraction results in a relatively large amount of irregularly shaped prills giving too many imperfectly coated particles and too long an induction period. The sphericity of the +6 mesh fraction is about 80%. Note the standard of 6 PPH (FIG. 10) encapsulating layer on this substrate gives 9% cumulative release at 2 hours (about 4% is maximum desirable) and gives a peak release at about 20 hours. This suggests a very long residual material with unacceptable amounts of imperfectly coated particles. By using Precoat C followed by 5.5 PPH encapsulation layer (FIG. 11), the percent imperfectly coated particles is reduced to less than about 5% at two hours, and peak release is about 13 hours.

The precoating of the current invention achieves several benefits:

1) Faster release products can be produced without increasing the imperfectly coated particle fraction even when less expensive core material is used. This allows the production of more efficient controlled release products.

2) Reduced coating levels (less expensive products can be made with as little as 5 PPH resin and Precoat B).

3) Decrease of the induction (inactive) period (minimal release rate) that was demonstrated, for example, with no linseed oil (see Table 1 and FIGS. 10–11).

Although the invention has been described in its preferred forms with a certain degree of particularity, it is to be understood that the present disclosure has been made by way of example only. Numerous changes in the details of the compositions and in the operational steps of the method and in the materials utilized therein will be apparent without departing from the spirit and scope of the invention, as defined in the appended claims.

We claim:

1. A controlled release fertilizer comprising:
   a granular core of nutrient material;
   a preliminary coating of an organic oil applied on the granular core; and,
   a polymeric encapsulating coat applied over the preliminary coating on the granular core while the organic oil is uncured;
   the preliminary coating being cured after application of the polymeric encapsulating coat.

2. The controlled release fertilizer of claim 1 wherein the organic oil is mixed with a binding agent selected from the group consisted of clays, talcs, diatomaceous earths, absorbent silicas, and mixtures thereof.

3. The controlled release fertilizer of claim 1 wherein the granular core has sphericity of 50% or less.

4. The controlled release fertilizer of claim 3 wherein the organic oil is raw linseed oil.

5. The controlled release fertilizer of claim 1 wherein the binding agent is a fine clay.

6. The controlled release fertilizer of claim 2 wherein the preliminary coating further includes a drier.

7. The controlled release fertilizer of claim 6 wherein the drier is selected from the group consisting of cobalt manganese, manganese, cobalt calcium, zirconium cobalt, and mixtures thereof.

8. The controlled release fertilizer of claim 1 wherein the core is selected from the group consisting of NPK granules, fertilizer granules, urea granules, and mixtures thereof.

9. The controlled release fertilizer of claim 8 in which the core further contains one or more secondary nutrients and micronutrients selected from the group consisting of calcium, sulfur, magnesium, iron, copper, zinc, manganese, boron and molybdenum.

10. The controlled release fertilizer of claim 1 wherein the core has sphericity of 50% or less and the controlled release fertilizer exhibits a 4% or less cumulative release at two hours in the ART-80 laboratory test when the encapsulating coat is at 8 parts per hundred of the core weight or less.

11. The controlled release fertilizer of claim 10 wherein the maximum incremental ART-80 laboratory test release is at 15 hours or less.

12. A controlled release fertilizer comprising:
    a granular core of nutrient material;
    a preliminary coating on the granular core of a mixture of (a) an oil selected from the group consisting of linseed oil, soybean oil, tung oil, dicyclopentadiene modified drying oils, and mixtures thereof and (b) a binding agent selected from the group consisting of fine clays, talcs, diatomaceous earths, absorbent silicas, and mixtures thereof; and,
    a polymeric encapsulating layer applied over the coating;
    the oil in the preliminary coating mixture being uncured; and
    the preliminary coating being cured after application of the polymeric encapsulating layer to the coated granular core.

13. The controlled release fertilizer of claim 12 wherein the polymeric encapsulating coat is a copolymer of dicyclopentadiene and a composition selected from the group consisting of linseed oil, an alkyd resin based on a soybean oil, and mixtures thereof.

14. The controlled release fertilizer of claim 12 wherein the core has sphericity of 50% or less and the controlled release fertilizer exhibits a 4% or less cumulative release at two hours in the ART-80 laboratory test when the encapsulating coat is at 8 parts per hundred of the core weight or less.

15. A controlled release fertilizer comprising a nutrient core, a coating of organic oil and an encapsulating polymeric layer produced by a process comprising the steps of:
    (a) applying the organic oil on the nutrient core while the organic oil is uncured;
    (b) applying the polymeric layer over the organic oil before the organic oil is cured; and,
    (c) simultaneously curing the organic oil and the polymeric layer.

16. The controlled release fertilizer of claim 15 wherein the organic oil is applied at about 140° F. or less.

17. The controlled release fertilizer of claim 16 wherein the simultaneous curing occurs at about 140° F. or above.

18. The controlled release fertilizer of claim 15 wherein the organic oil is mixed with a binding agent selected from the group consisting of fine clay, talc, diatomaceous earth, absorbent silicas, and mixtures thereof.

19. The controlled release fertilizer of claim 18 wherein the organic oil is further mixed with a drier selected from the group consisting of cobalt manganese, manganese, cobalt calcium, zirconium cobalt, and mixtures thereof.

20. The controlled release fertilizer of claim 18 wherein the oil is raw linseed oil.

21. The controlled release fertilizer of claim 20 wherein the binding agent is a fine clay.

22. The controlled release fertilizer of claim 21 wherein the polymeric encapsulating coat chosen from the group consisting of oleoresinous drying oils, polyesters, polyamides, polyurethanes, thermoplastic resins, dicyclopentadiene modified linseed oil, dicyclopentadiene modified allyd resins, hydrocarbon thermoplastic resins, and mixtures thereof.

23. The controlled release fertilizer of claim 22 in which the core has sphericity of 50% or less and the controlled release fertilizer exhibits a 4% or less cumulative release at two hours in the ART-80 laboratory test when the encapsulating coat is at 8 parts per hundred of the core weight or less.

24. A controlled release fertilizer containing a nutrient core, a precoat of linseed oil, a binding agent and a drier, and a polymeric encapsulating layer including dicyclopentadiene, the fertilizer having been produced by the steps of:
- (a) coating the core with the precoat at about 140° F. or less while the linseed oil is uncured;
- (b) encapsulating the precoat with the polymeric layer; and,
- (c) simultaneously curing the precoat and the encapsulating polymeric layer at about 140° F. or above.

25. The controlled release fertilizer of claim 24 wherein the core has sphericity of 50% or less and the controlled release fertilizer exhibits a 4% or less cumulative release at two hours in the ART-80 laboratory test when the encapsulating coat is at 8 parts per hundred of the core weight or less.

26. A process of making a controlled release fertilizer utilizing a nutrient core, the process consisting of the steps of:
- (a) precoating the nutrient core with oil, the oil selected from the group consisting of linseed oil, soybean oil, tung oil, dicyclopentadiene modified drying oils, and mixtures thereof;
- (b) applying an encapsulating layer of polymeric material over the precoated nutrient core, the polymeric layer being applied before the precoat is cured and while the oil is uncured; and,
- (c) curing the precoat after application of the encapsulating layer.

27. The process of claim 26 wherein the precoating mixture further comprises a binding agent selected from the group consisting of fine clay, talc, diatomaceous earth, absorbent silicas, and mixtures thereof, and a drier selected from the group consisting of cobalt manganese, manganese, cobalt calcium, zirconium cobalt, and mixtures thereof.

28. The process of claim 26 wherein the precoat and encapsulating coat are simultaneously cured.

29. The process of claim 26 wherein the precoating is exposed to temperatures of 140° F. or less prior to application of the encapsulating layer.

30. The process of claim 29 wherein the curing is accomplished by exposure to temperature of about 140° F. or more.

31. The process of claim 27 wherein the precoating is applied in the range of 0.5 to 3.0 parts per hundred of the weight of the nutrient core.

32. The process of claim 26 wherein the encapsulating layer is applied in the range of five to ten parts per hundred of the weight of the nutrient core.

33. The process of claim 26 wherein the core has sphericity of 50% or less and the controlled release fertilizer exhibits a 4% or less cumulative release at two hours in the ART-80 laboratory test when the encapsulating coat is at 8 parts per hundred of the core weight or less.

34. A process for making a controlled release fertilizer utilizing a core of nutrient having surface discontinuities, the process consisting of the steps of:
- (a) precoating the nutrient core with a mixture of raw linseed oil, a binding agent and a drier, the precoating applied in a proportion of about 0.5–3.0 parts per hundred of the weight of the core and being exposed to temperatures in the range of 140° F. or less while the linseed oil is uncured;
- (b) applying an encapsulating layer of polymeric material before the precoat is cured, the encapsulating layer being applied in a proportion of about five to ten parts per hundred of the weight of the core; and,
- (c) curing the precoat and the encapsulating layer at 140° F. or more.

35. The process of claim 34 wherein the core has sphericity of 50% or less and the controlled release fertilizer exhibits a 4% or less cumulative release at two hours in the ART-80 laboratory test when the encapsulating coat is at 8 parts per hundred of the core weight or less.

* * * * *